US011068411B2

(12) United States Patent
Palmer et al.

(10) Patent No.: US 11,068,411 B2
(45) Date of Patent: Jul. 20, 2021

(54) REDUCING IMPACT OF CONTEXT SWITCHES THROUGH DYNAMIC MEMORY-MAPPING OVERALLOCATION

(71) Applicant: International Business Machines Corporation, Armonk, NY (US)

(72) Inventors: Elaine Palmer, Hanover, NH (US); Tamas Visegrady, Zurich (CH); Silvio Dragone, Olten (CH); Michael Charles Osborne, Richterswil (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 169 days.

(21) Appl. No.: 16/524,385

(22) Filed: Jul. 29, 2019

(65) Prior Publication Data

US 2021/0034545 A1 Feb. 4, 2021

(51) Int. Cl.
*G06F 12/1045* (2016.01)
*G06F 12/14* (2006.01)
*G06F 12/0802* (2016.01)

(52) U.S. Cl.
CPC ...... *G06F 12/1045* (2013.01); *G06F 12/0802* (2013.01); *G06F 12/145* (2013.01)

(58) Field of Classification Search
None
See application file for complete search history.

(56) References Cited

U.S. PATENT DOCUMENTS

| 9,081,501 | B2 | 7/2015 | Asaad et al. |
| 9,898,297 | B2 | 2/2018 | Vorbach et al. |
| 9,971,713 | B2 | 5/2018 | Asaad et al. |
| 2017/0102963 | A1 | 4/2017 | Zhang et al. |
| 2018/0011651 | A1* | 1/2018 | Sankaran ............ G06F 3/0665 |

OTHER PUBLICATIONS

Alam, H., et al., "Do-it-yourself virtual memory translation", In Proceedings of the 44th Annual International Symposium on Computer Architecture, ISCA '17, pp. 457{468, New York, NY, USA, 2017. ACM.

(Continued)

*Primary Examiner* — Charles Rones
*Assistant Examiner* — Ryan Dare
(74) *Attorney, Agent, or Firm* — Cantor Colburn LLP; Edward Wixted

(57) ABSTRACT

A method including: receiving, via a processor, established upper bounds for dynamic structures in a multi-tenant system; creating, via the processor, arrays comprising related memory-management unit (MMU) mappings to be placed together; and placing the dynamic structures within the arrays, the placing comprising for each array: skipping an element of the array based on determining that placing a dynamic structure in that element would cause the array to become overcommitted and result in a layout where accessing all elements would impose a translation look aside buffer (TLB) replacement action; and scanning for an array-start entry by placing the start of a first element at an address from which an entire array can be placed without TLB contention, and accessing, via the processors, all non-skipped elements without incurring TLB replacements.

20 Claims, 5 Drawing Sheets

(56) References Cited

OTHER PUBLICATIONS

Amit, N., "Optimizing the TLB Shootdown Algorithm with Page Access Tracking," Jul. 12-14, 2017, Usenix: The Advanced Computing Systems Associattion, https://www.usenix.org/conference/atc17/technical-sessions/presentation/amit, Santa Clara, CA, USA, 15 pages.

ARM Ltd., "ARM Cortex—A Series Programmer's Guide for ARMv8-A (DEN0024A)," May 2015.

Authors et al.: Disclosed Anonymously, "CPC—Garbage Collection with prioritized object eviction mechanism," Apr. 25, 2012, An IP.com Prior ARt Database Technical Disclosure, IPCOM000216936D, 5 pages.

Authors et al.: Disclosed Anonymously, "Optimized Tenant Aware Garbage Collection," Nov. 11, 2013, An IP.com Prior Art Database Technical Disclosure, IPCOM000232459D, 4 pages.

Authors et al.: Disclosed Anonymously, "Caches", 2015 ARM, Non-Confidential, ARM DEN0024A, ID050815, 4 pages.

Authors et al.: Disclosed Anonymously, "Method and system for dynamic management of cache eviction in multitenant environments," Oct. 16, 2014, An IP.com Prior ARt Database Technical Disclosure, IPCOM000239143D, 4 pages.

Basu, A. et al., "Efficient virtual memory for big memory servers," In Proceedings of the 40th Annual International Symposium on Computer Architecture, ISCA '13, pp. 237-248, New York, NY, USA, 2013. ACM.

Cota, E. et al., "Cross-ISA machine emulation for multicores," In Proceedings of the 2017 International Symposium on Code Generation and Optimization (CGO 2017), CGO 2017, pp. 210{220, Piscataway, NJ, USA, 2017. IEEE Press.

Dougan, C. et al., "Optimizing the Idle Task and Other MMU Tricks," Department of Computer Science New Mexico Institute of Technology, 9 pages.

Free Software Foundation. GNU compiler collection (GCC) internals. online at gcc.gnu.org/onlinedocs/gccint/index.html, 2018. [accessed Jun. 26, 2018].

Free Software Foundation. Using the GNU compiler collection (GCC) (version 8.1.0). online at gcc.gnu.org/onlinedocs/gcc-8.1.0/gcc/, 2018. [accessed Jul. 11, 2018].

IBM. z/Architecture Principles of Operation (SA22-7832-10). IBM, eleventh edition, May 2015.

Inci, M. et al., "Cache attacks enable bulk key recovery on the cloud," Cryptology ePrint Archive, Report 2016/596, eprint.iacr.org/2016/596, Jun. 2016. [accessed May 15, 2018].

Intel Corporation, "Intel 64 and IA-64 Architectures Software Developer's Manual, Combined vols. 1, 2A, 2B, 2C, 2D, 3A, 3B, 3C, 3D and 4A (325462-067US)," May 2018.

International Business Machines Corporation (IBM), "Power ISA TM Version 10 B," Mar. 9, 2017, 4 pages.

International Business Machines Corporation (IBM), "PowerPC 476FP Embedded Processor Data and PowerPC 470S Synthesizable Core User's Manual, Version 1.5," Apr. 2011.

Kuznetsov, V. et al., "Code-pointer integrity," In 11th USENIX Symposium on Operating Systems Design and Implementation (OSDI 14), pp. 147{163, Broom_eld, CO, 2014. USENIX Association.

Lascu, O. et al., "IBM z14 Technical Guide (SG24-8451-00)", IBM, Feb. 2014.

Mittal, S., "A Survey of Techniquest for Architecting TLBs," 2016, Concurrency and Computation: Practice and Experience, Concurrency Computat.: Pract. Exper. 00, pp. 1-35.

PaX Team. PaX | gcc plugins galore. online at pax.grsecurity.net.docs/PaXTeam-H2HC13-PaX-gcc-plugins.pdf, Oct. 2013. [accessed May 30, 2018].

Schaik, et al., "RevAnC: A Framework for Reverse Engineering Hardware Page Table Caches," Apr. 23, 2017, EuroSec '17, 6 pages.

Torvalds, L. "Re: VLA (variable-length array) removal (from the Linux kernel)," online at lkml.org/lkml/2018/3/7/621, Mar. 2018. [accessed Jun. 26, 2018].

* cited by examiner

REDUCING IMPACT OF CONTEXT SWITCHES THROUGH DYNAMIC MEMORY-MAPPING OVERALLOCATION

BACKGROUND

The present invention generally relates to reducing the impact of context switches, and more specifically, to reducing the impact of context switches in multi-tenant systems through dynamic memory-mapping overallocation.

State-of-the-art processors include complicated cache infrastructures to overcome the disparity between processor and memory speeds. Cache-related overhead can add significant latency and timing variation during context switches. High-assurance systems, split into multiple processes by necessity, must endure frequent context switches as control passes between processes.

Hardware security modules (HSMs) and similar trustworthy systems may need to partition execution into processes to minimize resource sharing between co-resident entities. Such specialized software is deployed into known configurations, and its environment prevents dynamic code updates. Most of these non-modifiable environments also restrict runtime variation; as an example, they start only a fixed set of processes. Unlike general-purpose systems, these restrictions together may allow fixed upper bounds to be set on data structure sizes or communication-channel capacity.

SUMMARY

According to embodiments of the present invention, a non-limiting computer-implemented method includes: receiving, via a processor, established upper bounds for dynamic structures in a multi-tenant system; creating, via the processor, arrays comprising related memory-management unit (MMU) mappings to be placed together; and placing the dynamic structures within the arrays, the placing comprising for each array: skipping an element of the array based on determining that placing a dynamic structure in that element would cause the array to become overcommitted and result in a layout where accessing all elements would impose a translation look aside buffer (TLB) replacement action; and scanning for an array-start entry by placing the start of a first element at an address from which an entire array can be placed without TLB contention, and accessing, via the processors, all non-skipped elements without incurring TLB replacements.

Other embodiments of the present invention implement features of the above-described method in computer systems and computer program products.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

One or more embodiments of the present invention reduce the impact of context switches in multi-tenant systems by scanning for an array-start entry which can be placed without translation look aside buffer (TLB) contention.

High-security multi-tenant computing systems, typical in hardware security modules (HSMs), control access to shared, sensitive memory of tenants. As used herein, the term "tenant" refers to an owner of a virtual machine or process, executing co-resident with other tenants' code. Since high-assurance HSM applications require at least process-level separation between tenants, they incur the high costs of context switches which are required for HSM applications. With HSM applications, lighter separation techniques, such as threads, are insufficient because they result in different entities sharing address spaces. One or more embodiments of the present invention can alleviate much of the overhead of these context switches by using specialized memory layouts where all memory may be simultaneously accessed without replacing (i.e., flushing) memory-management structures. Such memory layouts may be generated offline for specific hardware/software environments which may model processor-cache behavior offline, for example, based on processor-cache models.

One costly consequence of context switches is the eviction of cache-related structures. Context switches imply flushing certain structures used by memory-address translation look aside buffers (TLBs). Contemporary processors may cache thousands of TLBs simultaneously, and are capable of maintaining that many region mappings entirely cached. Practical TLB-mapping schemes partition TLB buffers into independent slices for efficiency, leading to uneven utilization: some slices are "oversubscribed" and force TLB flushes even while tables are not full.

Acknowledging the need for frequent context switches, one or more embodiments of the present invention described herein optimize memory layouts to minimize the number of TLB eviction events by selecting addresses which maximize TLB utilization by intentionally reserving large, unused address ranges.

Figure 1:
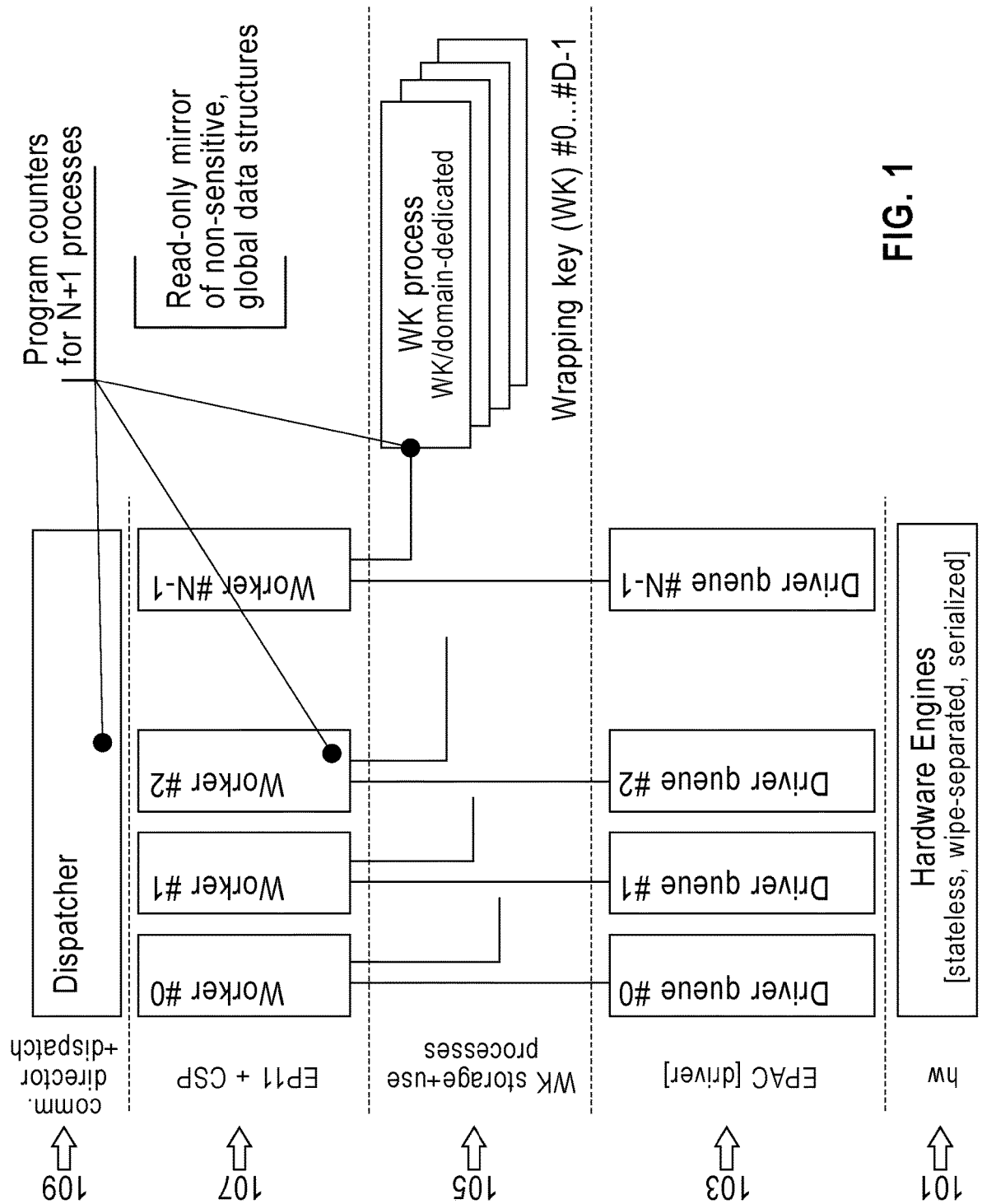
FIG. 1 illustrates a workflow diagram of a process according to one or more embodiments of the present invention.

Turning now to FIG. 1, the processing and internal segmentation of firmware of a hardware security module (HSM) is generally shown in accordance with one or more embodiments of the present invention. A representative HSM application is crypto-provider (CSP) code executed by multiple processes, each managing its disjoint set of keys but otherwise executing the same code. A single executable address-mapping entry serves all processes, while there are dedicated writable windows for each process. In HSMs, request-dedicated workers (e.g., processes assigned to manage a single request) and independent key-managing processes (e.g., processes managing execution for a single key) may also be present.

Execution inside the HSM is controlled by a request-response flow. A top-level dispatcher 109 controls the flow. A fixed number (N) of worker processes 107, assigned by the dispatcher 109, operate on requests. When the worker processes 107 are started, worker processes 107 share code through a read-only mapping of any executable (binary) image also present as a non-modifiable TLB mapping (not shown). The HSM stores security-critical keys—such as 'wrapping keys' (WKs) serving as top-level keys for hierarchical structures 105. Each internal partition ("key domain") is exclusive owner of its WK 105 and related sensitive structures (data and control structures associated with security-critical keys and state). The WK 105 managing processes share a single, read-only, shared mapping for their executable, and they are assigned a single writable DRAM (not shown) region through a non-modifiable mapping. Separate cryptographic-engine queues form device drivers 103. Transfers through the drivers 103 use dedicated memory regions and hardware engines 101 appear as blocking devices. There are never more than N hardware engines 101 having access requests for N worker processes 107. The hardware engine 101 enforces the separation of requests from the different EPAC 103 queues, including complete control of DMA channels. This functionality is opaque to software, and requires no software support beyond the allocation of separate hardware-owned buffers.

Still referring to FIG. 1, data structures belonging to internal entities may be redefined as arrays of uniform-sized elements. Sensitive data may be moved out to a set of processes, each process dealing with its own data structures, and the rest of application/infrastructure can be restructured to access these data structures only indirectly. Separating sensitive structures from all request-related data, leads to more regular, array-like structures, since the size and structure of sensitive 'core' secrets is generally unrelated to those of request/response-related, possibly dynamic structures.

Figure 2C:
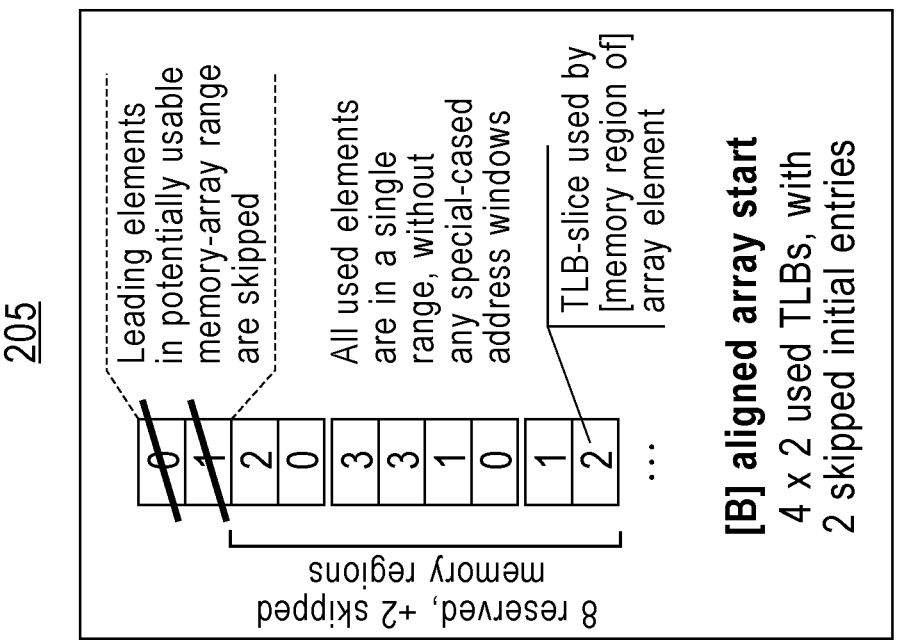
FIG. 2C illustrates another array allocation according to one or more embodiments of the present invention.
Figure 2B:
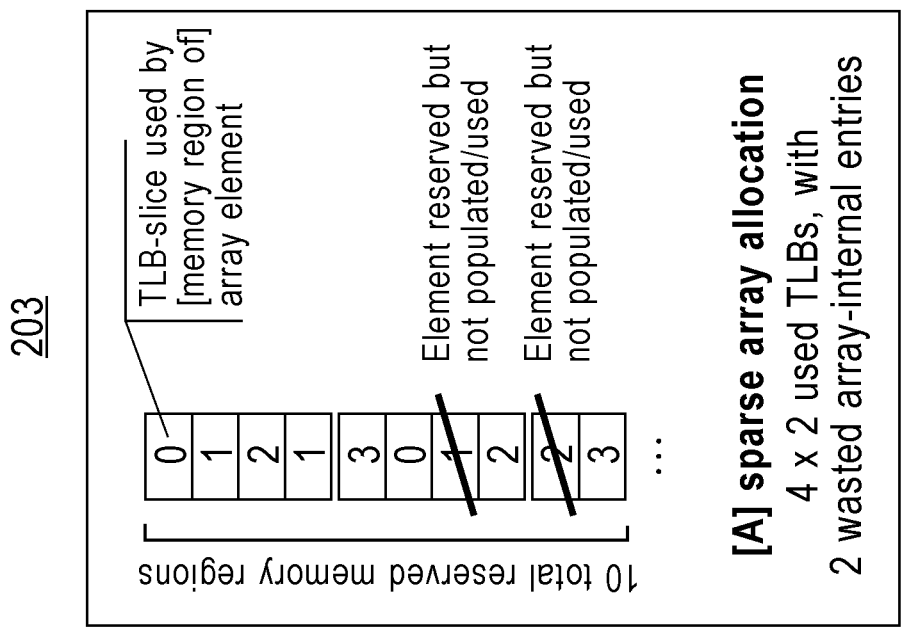
FIG. 2B illustrates an array allocation according to one or more embodiments of the present invention.
Figure 2A:
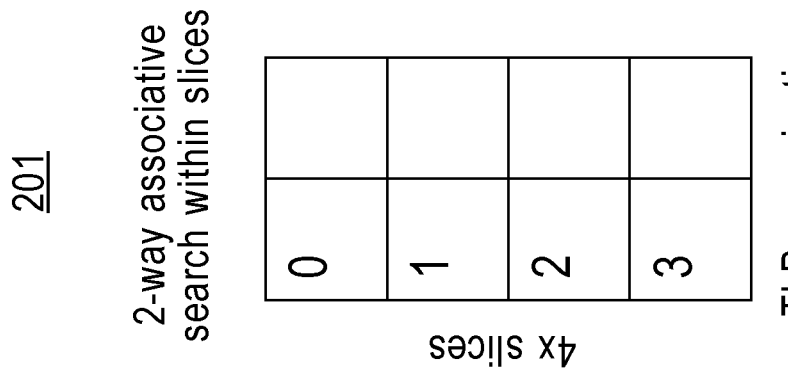
FIG. 2A illustrates a 2-way associative search slice diagram according to one or more embodiments of the present invention.

Referring to FIG. 2A, a 2-way association 201 having slices of a TLB organization having 4× slices in generally shown in accordance with one or more embodiments of the present invention. The scaled-down TLB-layout example shown in FIG. 2A qualitatively resembles much larger real-world TLB schemes (this example shows eight total TLB entries organized as four slices of two entries each). The distribution properties of the hash function used by the small sample are representative of documented or reverse-engineered slice-assigning hash functions, scaled down to demonstrate TLB placement in a realistic-looking order. As an offline activity, worst-case upper bounds are established by a process count or by using a minimal amount of memory. In addition, one or more embodiments of the present invention enumerate uses of the all memory regions using these worst-case limits and list all TLB mappings needed to describe them, including restrictions or any other detail relevant to TLB mappings. Then groupings of related or identical-sized memory management unit (MMU) mappings are placed into arrays.

The address range of each array is scanned and only those address ranges which do not overcommit TLB-cache slices are accepted. A search is done for addresses having arrays larger than strictly necessary. Within oversized arrays, allocated but ignore (i.e. do not actually do not access) elements which would overcommit TLB mappings. Instead of array elements which would overcommit non-colliding superfluous elements, those present in the array but excluded from use to prevent accessing specific address regions, of the oversized array served as their replacements. However, observing their use leading to overutilization of TLB sets, marking and ignoring these elements takes constant time at the cost of memory overallocation.

FIGS. 2B and 2C show allocation (203, 205) examples which create allocations for eight entries (net), at the cost of including two superfluous elements (ten windows reserved, total) in accordance with one or more embodiments of the present invention. In the example shown in FIGS. 2B and 2C, the crossed-out elements would overcommit the TLB slices they are mapped to, if they were ever utilized, as the net array-element count is equal to total TLB capacity.

In an embodiment that does not have a preference for contiguously allocated arrays or prefers the simplicity of simply ignoring unsuitable elements without iterative attempts, array elements which would overcommit a TLB slice as a sparse array allocation 203 are skipped. If the MMU uses a sufficiently simple TLB-hashing function then the indexes conflicting entries are enumerated either as a function of array start address, element count, or a reverse sum of the hash function. Simply enumerating array-entry addresses and skipping TLB-overcommitting ones in chronological order is sufficient, and more importantly, it requires no iterations. Leaving elements not to be referenced at runtime in the array presents reuse of its addresses which would, if used, caused TLB replacements. The necessary addition, mapping between array indexes and their actual addresses, needs a lookup table that stores an index for each utilized entry so that the array indexes appear to be contiguous.

Embodiments using consecutive memory addresses locate a start address with skipped entries at the start of the array region as part of an aligned array start 205. As a fringe benefit, these selective assignments are simpler to describe than selectively skipped entries. This modification creates mappings with less special-case skipped regions, or possibly entirely without special cases. This may be preferable when the system needs to interact with hardware engines, in order to address the entire array as a single memory window (from a hardware/engine perspective). Selective skipping and iterative array-start placement may be used in combination. Their effectiveness depends on the number of TLB entries, and the available physical and virtual address ranges.

As described previously both placement methods will be accelerated if more memory is available. Using more memory allows for a wider scan range of physical memory addresses as single operations. Access to more address bits than strictly necessary allows for the evaluation of more bit combinations which otherwise describe identically sized and spaced array elements.

Figure 3B:
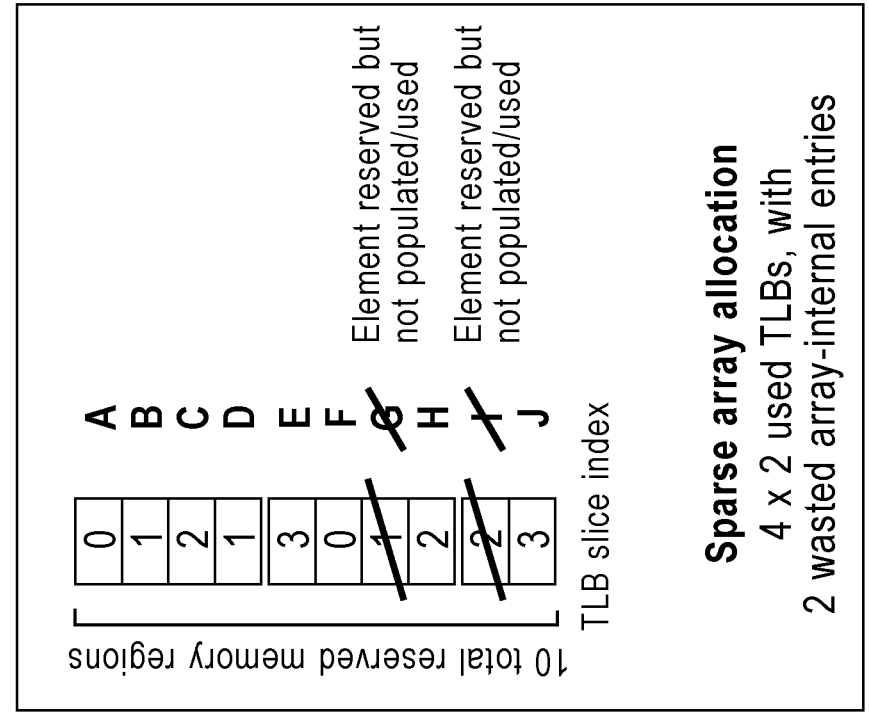
FIG. 3B illustrates an array allocation example according to one or more embodiments of the present invention.
Figure 3A:
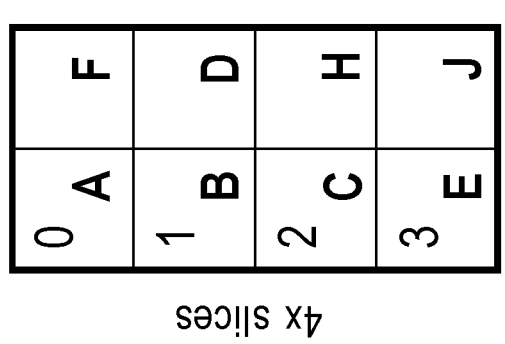
FIG. 3A illustrates a 2-way associative search slice example according to one or more embodiments of the present invention.

Using the representative example from FIGS. 2A and 2B, in accordance with one or more embodiments, FIGS. 3A and 3B show array elements A : : : J are assigned, maps into the TLB-slice distribution shown in TLB organization 301, and the allocation 303. With this assignment, all non-skipped elements may be accessed without leading to TLB replacements. All elements may simultaneously reside in active TLBs. Elements G and I are nominally assigned, but their memory is never accessed. Dereferencing their TLB entries would lead to contention and TLB replacement with those of B and D, or C and H, respectively, since the addresses of B, D, and G all hash the '01' slice of the TLB array, accessing these three elements in any order would lead to a TLB replacement: since only two TLBs may be simultaneously cached in the 2-entry array dedicated to storing data for any region hashed to the '01' slice.

Figure 4:
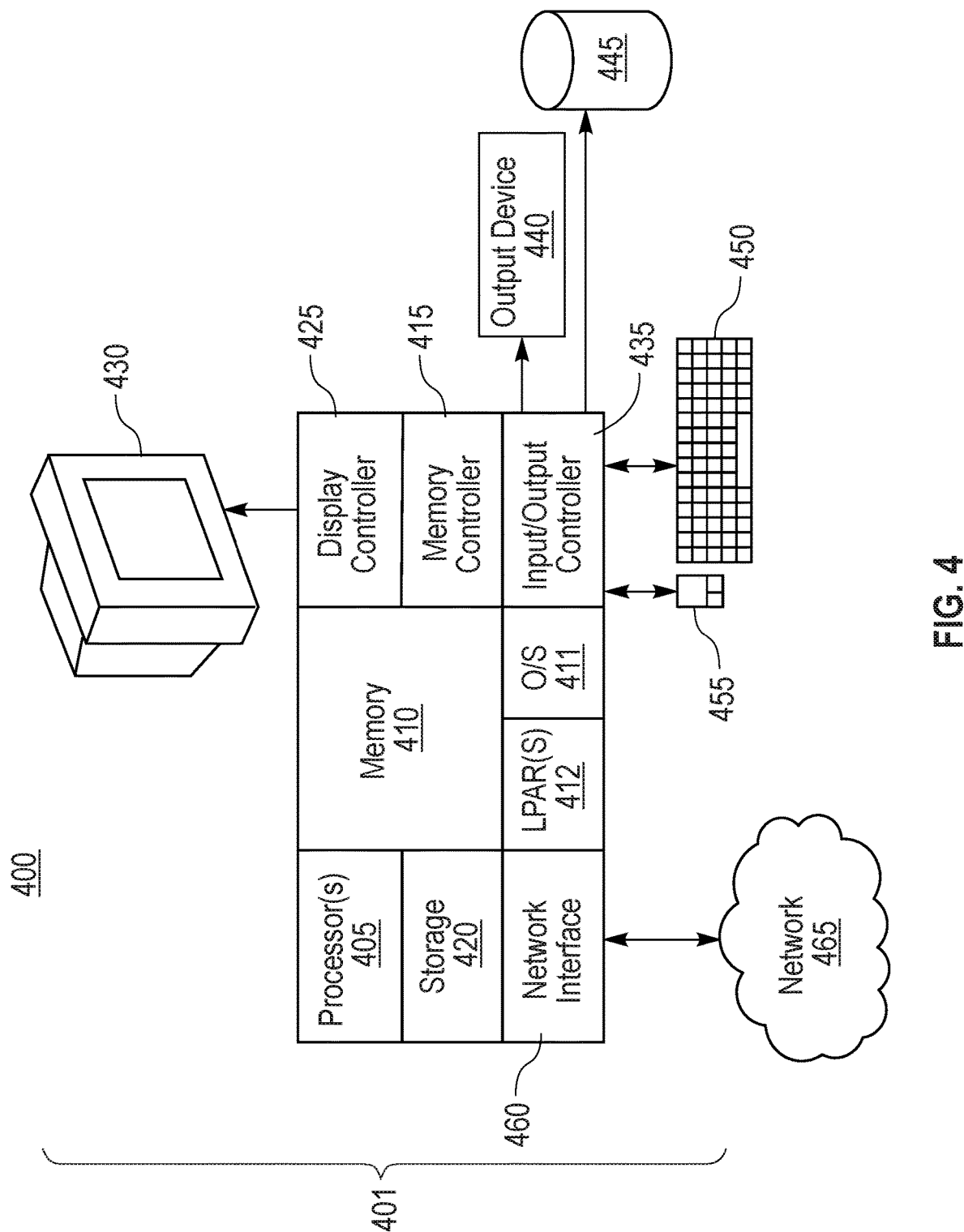
FIG. 4 illustrates a computer system according to one or more embodiments of the present invention.

Turning now to FIG. 4, a computer system 400 for reducing the impact of context switches in multi-tenant systems through dynamic memory-mapping overallocation is generally shown in accordance with one or more embodiments of the present invention. The methods described herein can be implemented in hardware, software (e.g., firmware), or a combination thereof. In an exemplary embodiment, the methods described herein are implemented in hardware as part of the microprocessor of a special or general-purpose digital computer, such as a personal computer, workstation, minicomputer, or mainframe computer. The system 400 therefore may include general-purpose computer or mainframe 401 capable of running multiple instances of an O/S simultaneously.

In an exemplary embodiment, in terms of hardware architecture, as shown in FIG. 4, the computer 401 includes one or more processors 405, memory 410 coupled to a memory controller 415, and one or more input and/or output (I/O) devices 440, 445 (or peripherals) that are communicatively coupled via a local input/output controller 435. The input/output controller 435 can be, for example but not limited to, one or more buses or other wired or wireless connections, as is known in the art. The input/output controller 435 may have additional elements, which are omitted for simplicity, such as controllers, buffers (caches), drivers, repeaters, and receivers, to enable communications. Further, the local interface may include address, control, and/or data connections to enable appropriate communications among the aforementioned components. The input/output controller 435 may include a plurality of sub-channels configured to access the output devices 440 and 445. The sub-channels may include fiber-optic communications ports.

The processor 405 is a hardware device for executing software, particularly that stored in storage 420, such as cache storage, or memory 410. The processor 405 can be any custom made or commercially available processor, a central processing unit (CPU), an auxiliary processor among several processors associated with the computer 401, a semiconductor based microprocessor (in the form of a microchip or chip set), a macroprocessor, or generally any device for executing instructions.

The memory 410 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 410 may incorporate electronic, magnetic, optical, and/or other types of storage media. Note that the memory 410 can have a distributed architecture, where various components are situated remote from one another, but can be accessed by the processor 405.

The instructions in memory 410 may include one or more separate programs, each of which comprises an ordered listing of executable instructions for implementing logical functions. In the example of FIG. 4, the instructions in the memory 410 a suitable operating system (OS) 411. The operating system 411 essentially controls the execution of other computer programs and provides scheduling, input-output control, file and data management, memory management, and communication control and related services.

The memory 410 may include multiple logical partitions (LPARs) 412, each running an instance of an operating system. The LPARs 412 may be managed by a hypervisor, which may be a program stored in memory 410 and executed by the processor 405.

In an exemplary embodiment, a conventional keyboard 450 and mouse 455 can be coupled to the input/output controller 435. Other output devices such as the I/O devices 440, 445 may include input devices, for example but not limited to a printer, a scanner, microphone, and the like. Finally, the I/O devices 440, 445 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 400 can further include a display controller 425 coupled to a display 430. In an exemplary embodiment, the system 400 can further include a network interface 460 for coupling to a network 465. The network 465 can be an IP-based network for communication between the computer 401 and any external server, client and the like via a broadband connection. The network 465 transmits and receives data between the computer 401 and external systems. In an exemplary embodiment, network 465 can be a managed IP network administered by a service provider. The network 465 may be implemented in a wireless fashion, e.g., using wireless protocols and technologies, such as WiFi, WiMax, etc. The network 465 can also be a packet-switched network such as a local area network, wide area network, metropolitan area network, Internet network, or other similar type of network environment. The network 465 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 401 is a PC, workstation, intelligent device or the like, the instructions in the memory 410 may further include a basic input output system (BIOS) (omitted for simplicity). The BIOS is a set of essential software routines that initialize and test hardware at startup, start the OS 411, and support the transfer of data among the hardware devices. The BIOS is stored in ROM so that the BIOS can be executed when the computer 401 is activated.

When the computer 401 is in operation, the processor 405 is configured to execute instructions stored within the memory 410, to communicate data to and from the memory 410, and to generally control operations of the computer 401 pursuant to the instructions.

Figure 5:
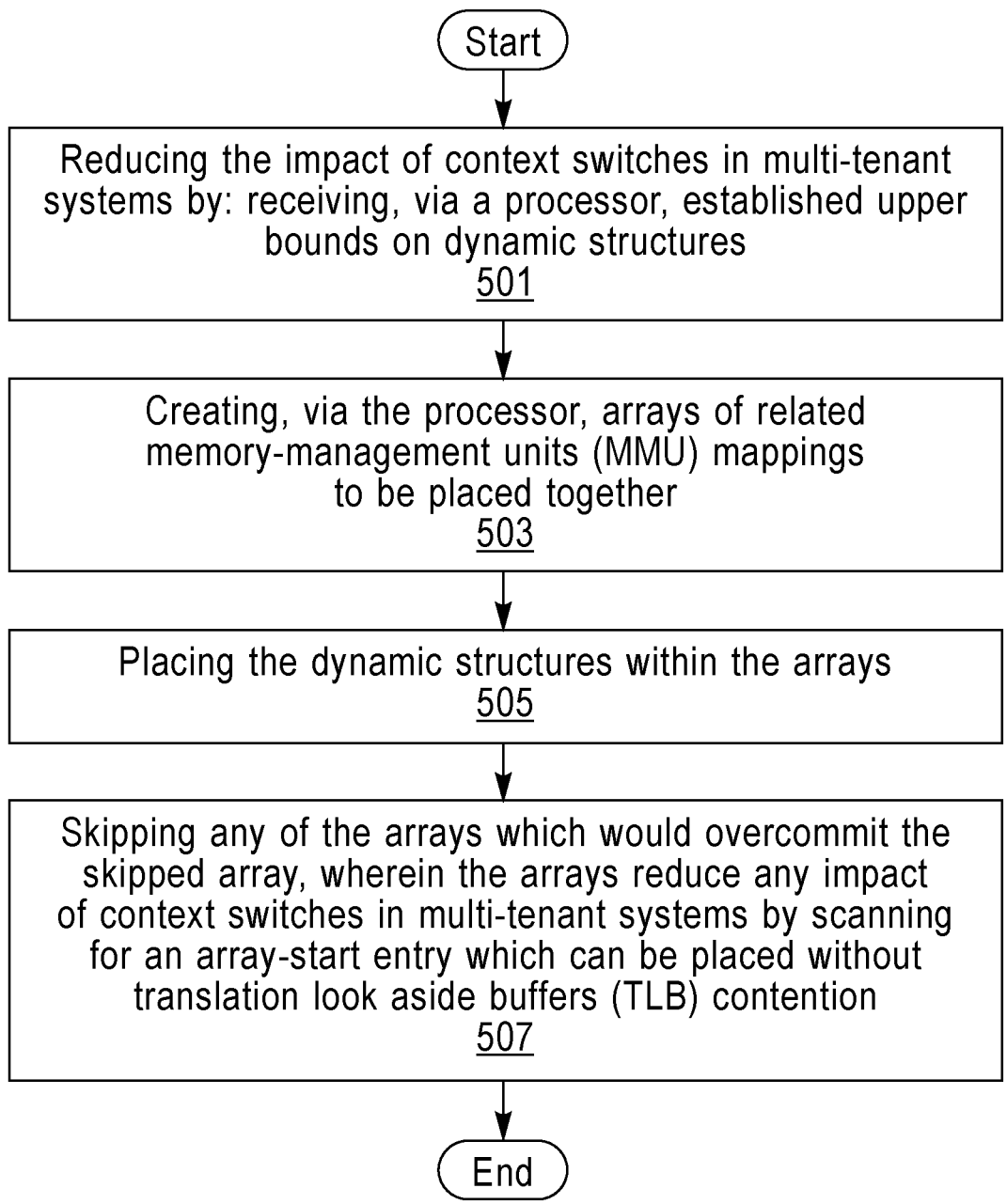
FIG. 5 illustrates a flow diagram of a process according to one or more embodiments of the present invention.

Turning now to FIG. 5, a flow diagram of a process for reducing the impact of context switches is generally shown in accordance with one or more embodiments of the present invention. The process starts, at block 501, by receiving, via a processor, established upper bounds on dynamic structures. The process continues, at block 503, by creating arrays of related memory-management unit (MMU) mappings to be placed together and at block 505, the dynamic structures are placed within the arrays. The process finishes, at block 507, with skipping any of the arrays which would overcommit the skipped array, wherein the arrays reduce any impact of context switches in multi-tenant systems by scanning for an array-start entry which can be placed without translation look aside buffers (TLB) contention.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Aspects of the invention are not limited in their application to the details of construction and the arrangement of the components set forth in the following description or illustrated in the drawings. The embodiments of the invention described herein are applicable to other embodiments or are capable of being practiced or carried out in various ways. The phraseology and terminology employed herein are for the purpose of description and should not be regarded as limiting. As will be appreciated by one skilled in the art, aspects of the present invention can be embodied as a system, method or computer program product.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
receiving, via a processor, established upper bounds for dynamic structures in a multi-tenant system;
creating, via the processor, arrays comprising related memory-management unit (MMU) mappings to be placed together; and
placing the dynamic structures within the arrays, the placing comprising for each array:
determining that placing a dynamic structure in that element would cause the array to become overcommitted and result in a layout where accessing all elements would impose a translation look aside buffer (TLB) replacement action; based on the determination, skipping an element of the array; and
scanning for an array-start entry by placing the start of a first element at an address from which an entire array can be placed without TLB contention, and
accessing, via the processors, all non-skipped elements without incurring TLB replacements.

2. The method according to claim 1, wherein the related MMU mappings to be placed together all have the same size.

3. The method according to claim 1, wherein the established upper bounds for dynamic structures include an amount of memory which must be present within each MMU mapping.

4. The method according to claim 1, wherein for each array, allow for over allocation to maximize translation look aside buffers (TLB) cache slice utilization.

5. The method according to claim 4, wherein the over allocation to maximize TLB-cache slice utilization is done without the need to access more TLB entries than physically available.

6. The method according to claim 4, wherein the over allocation to maximize TLB-cache slice utilization ignores TLB-flush efficiency.

7. The method according to claim 1, wherein the multi-tenant systems are high security computing systems.

8. A system comprising:
a memory having computer readable instructions; and one or more processors for executing the computer readable instructions, the computer readable instructions controlling the one or more processors to perform operations comprising; receiving established upper bounds for dynamic structures in a multi-tenant system;
creating arrays comprising related memory-management unit (MMU) mappings to be placed together; and
placing the dynamic structures within the arrays, the placing comprising for each array:
determining that placing a dynamic structure in that element would cause the array to become overcommitted and result in a layout where accessing all elements would impose a translation look aside buffer (TLB) replacement action; based on the determination, skipping an element of the array; and
scanning for an array-start entry by placing the start of a first element at an address from which an entire array can be placed without TLB contention, and
accessing, via the processors, all non-skipped elements without incurring TLB replacements.

9. The system according to claim 8, wherein the related MMU mappings to be placed together all have the same size.

10. The system according to claim 8, wherein the established upper bounds for dynamic structures include an amount of memory which must be present within each MMU mapping.

11. The system according to claim 8, wherein for each array, allow for over allocation to maximize translation look aside buffers (TLB) cache slice utilization.

12. The system according to claim 11, wherein the over allocation to maximize TLB-cache slice utilization is done without the need to access more TLB entries than physically available.

13. The system according to claim 11, wherein the over allocation to maximize TLB-cache slice utilization ignores TLB-flush efficiency.

14. The system according to claim 13, wherein the multi-tenant systems are high security computing systems.

15. A computer program product comprising:
one or more computer-readable storage medium, wherein the computer readable storage medium is not a transitory signal per se;
program instructions, stored on at least one of the one or more storage medium, to established upper bounds for dynamic structures;
program instructions, stored on at least one of the one or more storage medium, to create arrays of related memory-management units (MMU) mappings to be placed together;
program instructions, stored on at least one of the one or more storage medium, to place the dynamic structures within the arrays;
program instructions, stored on at least one of the one or more storage medium, to determine that placing a dynamic structure in that element would cause the array to become overcommitted and result in a layout where accessing all elements would impose a translation look aside buffer (TLB) replacement action;

program instructions, stored on at least one of the one or more storage medium, based on the determination, to skip an element of the array; and program instructions, stored on at least one of the one or more storage medium, to scan for an array-start entry by placing the start of a first element at an address from which an entire array can be placed without TLB contention, and program instructions, stored on at least one of the one or more storage medium, to access, via the processors, all non-skipped elements without incurring TLB replacements.

16. The computer program product according to claim 15, wherein the related MMU mappings to be placed together all have the same size.

17. The computer program product according to claim 15, wherein for each array, allow for over allocation to maximize translation look aside buffers (TLB) cache slice utilization.

18. The computer program product according to claim 17, wherein the over allocation to maximize TLB-cache slice utilization is done without the need to access more TLB entries than physically available.

19. The computer program product according to claim 17, wherein the over allocation to maximize TLB-cache slice utilization ignores TLB-flush efficiency.

20. The computer program product according to claim 16, wherein the multi-tenant systems are high security computing systems.

\* \* \* \* \*